(12) United States Patent
Rokade et al.

(10) Patent No.: US 10,643,080 B2
(45) Date of Patent: May 5, 2020

(54) ARTIFICIAL INTELLIGENCE AND IMAGE PROCESSING-BASED WORK FORCE SAFETY

(71) Applicant: HONEYWELL INTERNATIONAL INC., Morris Plains, NJ (US)

(72) Inventors: Vishram Rokade, Shajapur (IN); Jayaraj Karakunnath Puthanveetil, Karnataka (IN)

(73) Assignee: Honeywell International Inc., Morris Plains, NJ (US)

( * ) Notice: Subject to any disclaimer, the term of this patent is extended or adjusted under 35 U.S.C. 154(b) by 112 days.

(21) Appl. No.: 15/952,937

(22) Filed: Apr. 13, 2018

(65) Prior Publication Data
US 2019/0318170 A1  Oct. 17, 2019

(51) Int. Cl.
| | |
|---|---|
| G06K 9/00 | (2006.01) |
| H04N 7/18 | (2006.01) |
| G06T 7/00 | (2017.01) |
| G06Q 30/00 | (2012.01) |

(52) U.S. Cl.
CPC ..... *G06K 9/00771* (2013.01); *G06K 9/00281* (2013.01); *G06K 9/00362* (2013.01); *G06Q 30/018* (2013.01); *G06T 7/97* (2017.01); *H04N 7/181* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 8,208,681 B2 * | 6/2012 | Heller | G06K 9/2054 340/500 |
| 9,143,843 B2 | 9/2015 | De Luca et al. | |
| 2012/0146789 A1 * | 6/2012 | De Luca | G08B 21/12 340/540 |
| 2018/0199639 A1 * | 7/2018 | Insley | A41D 13/00 |

* cited by examiner

*Primary Examiner* — Delomia L Gilliard

(57) ABSTRACT

A method of workplace safety for an industrial processing facility includes an AI and image processing-based work force safety system at a first time receiving image data from cameras viewing work zones including a first camera showing an individual in a first work zone. From the image data a current location of the individual is determined. A current minimum Personnel Protection Equipment (PPE) requirement is determined based on the current location by referencing a database having workplace environments with hazardous condition(s) including for the current location determining a current workplace environment having a current hazardous condition, and required PPEs for the current hazardous condition. The image data is analyzed to identify PPEs currently worn by the individual. When it is determined the individual is not currently meeting the PPE requirement by comparing the PPEs currently worn to the minimum PPE requirement, an alert is generated responsive to the unsafe condition.

14 Claims, 2 Drawing Sheets

ARTIFICIAL INTELLIGENCE AND IMAGE PROCESSING-BASED WORK FORCE SAFETY

FIELD

Disclosed embodiments relate to video monitoring for work force safety in industrial process facilities.

BACKGROUND

Generally considered to be the most important asset of any organization is its employees, so that personnel safety is usually of paramount importance in any industry. This has led to mandatory and rigorous safety trainings and procedures at an industrial processing facility (IPF). One of the most important parts of the training is regarding proper use of Personnel Protection Equipment (PPE), which when used properly are effective as the last line of personal protection in manufacturing's various high risk activities.

PPE can prevent or reduce the risk of eye, head or other bodily injury from activities such as handling dangerous chemicals, dangerous substances, and pressurized gases, or from working with potentially dangerous machinery and tools such as welding equipment. Awareness regarding the usage of the correct PPEs and enforcing them in the field has always been a challenge in the process industries. Unfortunately, history shows the PPEs which employers provide to their workers are often not worn.

Even if the employee is safety trained regarding use of PPEs, unsafe behaviors and the practice of ignoring the use of correct PPEs can cause accidents at sites leading to loss of production, injury to personnel, and in worst case can cause fatalities. The underlying causes of an employee's failure to use proper PPEs can include little or no supervision, lack of proper procedures, poor awareness or risk perception, human error, or misjudgment.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize there is believed to generally be no known way to ensure that individuals working in a hazardous area within an IPF are using the right PPE(s) other than believing that he or she is. The current PPE ensuring practice followed by employers at an IPF is to make their employees undergo regular safety trainings. There is generally manual supervision at the work place and communication regarding importance of PPEs. Many employers also ensure that the right set of PPEs are documented along with the work permit, which is issued to the individual who is assigned the job. However, this known PPE ensuring practice is also recognized to not ensure that an individual entering a potentially hazardous area on the field level of an IPF is actually using the required PPEs.

This Disclosure provides artificial intelligence (AI) and image processing-based work force safety systems that ensure that proper PPEs are being worn, which solves the problem of workers entering a potentially hazardous area within an IPF not wearing the needed PPE(s). Video surveillance is employed for work zones that are designated as hazardous or non-hazardous work zones that become hazardous, such as due to a fire or a gas leak. AI along with image recognition is used to monitor whether the individuals entering or working in a hazardous work area are wearing the right PPE(s). If the right PPE(s) being worn the proper way (e.g., gloves on the hands, helmet on the head, and safety goggles on one's face) is not detected, the AI and image processing-based work force safety system can automatically trigger an alarm as well as instructions on what particular PPE(s) is missing, or what next steps should be taken. Disclosed work force safety systems can be used in generally any kind of work environments (with varied requirement of PPEs) to help ensure safety of the work force.

One disclosed embodiment comprises a method of workplace safety for an IPF that includes an AI and image processing-based safety system at a first time receiving real-time image data from cameras viewing work zones including a first camera showing an individual in a first work zone. From the image data a current location of the individual is determined. A current minimum PPE requirement is determined for the individual based on the current location by referencing a database having workplace environments with hazardous condition(s) including for the current location a current workplace environment having a current hazardous condition, and the required PPEs for the current hazardous condition. The image data is analyzed to identify PPEs currently being worn by the individual. When it is determined the individual is not currently meeting the current minimum PPE requirement by comparing the PPEs currently worn to the current minimum PPE requirement, an alert is generated responsive to the unsafe condition.

DETAILED DESCRIPTION

Figure 1:
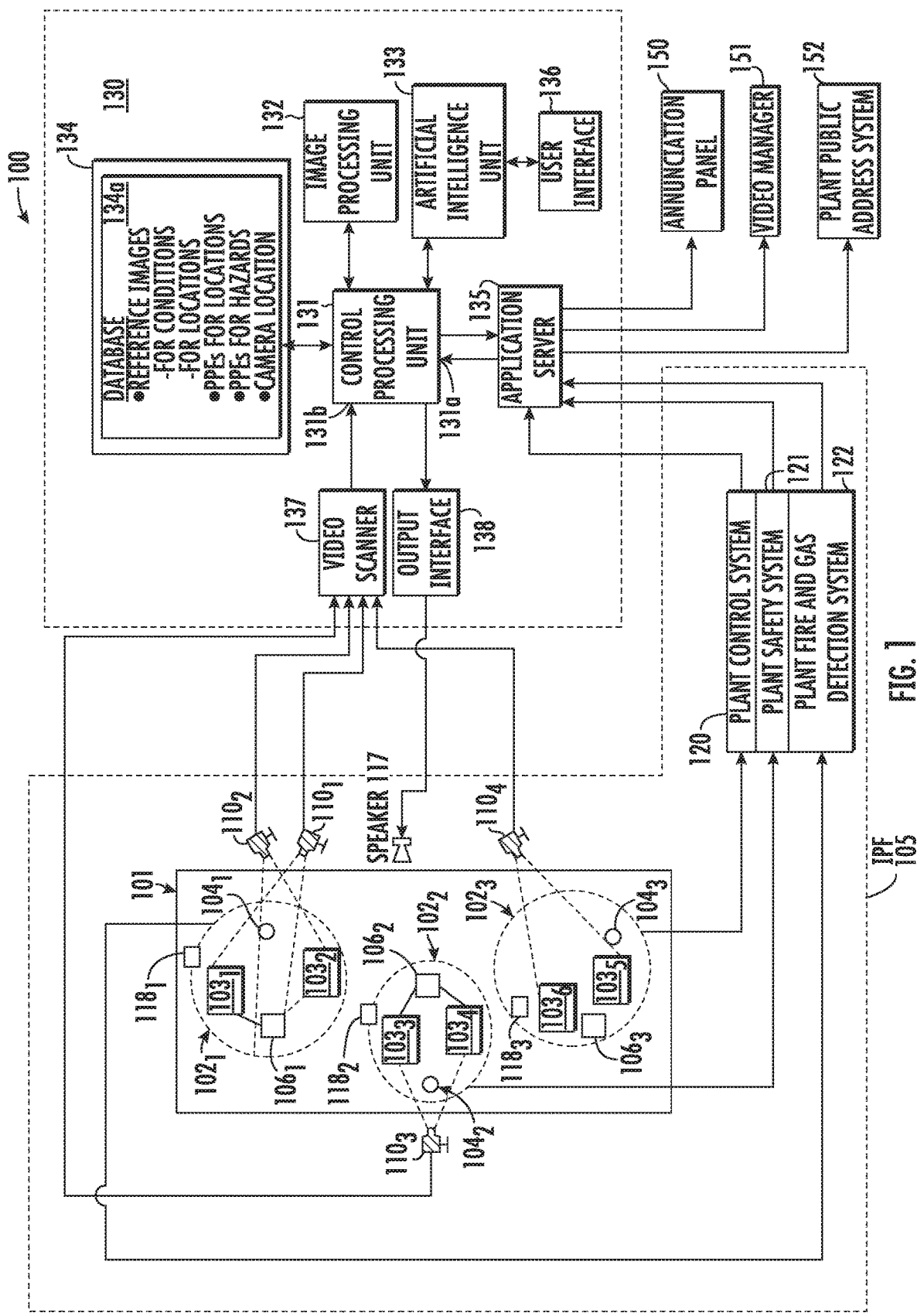
FIG. 1 depicts an industrial arrangement including a disclosed AI and image processing-based work force safety system in operation implementing industrial work force safety in an IPF, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

FIG. 1 depicts an industrial arrangement 100 including a disclosed AI and image processing-based work force safety system 130 in operation implementing industrial work force safety in an IPF 105. As used herein an IPF runs an industrial process involving a tangible material that disclosed embodiments apply. For example, oil and gas, chemical, beverage, pharmaceutical, pulp and paper manufacturing, petroleum processes, electrical, and water. An IPF is distinct from a data processing system that only performs data manipulations.

The IPF 105 includes a field level 101 comprising a plurality of work zones $102_1$, $102_2$, $102_3$ having field devices $103_1$, $103_2$, $103_3$, $103_4$, $103_5$, $103_6$ including sensors and actuators that are coupled to processing equipment $106_1$, $106_2$, $106_3$, that are all coupled to a process control system 120. Non-camera sensors $104_1$, $104_2$ and $104_3$, such as comprising a fire or a gas sensor (e.g. for sensing a chlorine leak) are also shown in the work zones. A speaker 117 is also shown in the IPF, where the IPF generally includes a plurality of speakers, which are driven by an output interface 138 from the control processing unit 131 of the work force safety system 130. Also shown in parallel to the process control system 120 is a plant safety system 121, and plant fire and gas detection system 122.

An application server 135 is shown coupled to receive inputs from the process control system 120 including from the field devices $103_1$, $103_2$, $103_3$, $103_4$, $103_5$, $103_6$ and non-camera sensors $104_1$, $104_2$ and $104_3$. The control processing unit 131 has a first input 131*a* is coupled to an output of the application server 135 and a second input 131*b* coupled to an output of a video scanner 137 that is coupled to receive real-time image data from a plurality of cameras $110_1$, $110_2$, $110_3$, $110_4$ collectively viewing the plurality of work zones $102_1$, $102_2$, $102_3$ including at least a first camera showing an individual in a first work zone of the work zones. A camera placed at the entrance(s) of these particular work zones can capture real-time images of the people entering.

An image processing unit 132 and an AI unit 133 that provides machine learning are both coupled to the control processing unit 131. The image processing unit 132 and AI unit 133 process image data provided by the cameras $110_1$, $110_2$, $110_3$, $110_4$, which can be in the form of streaming (real-time) video. An application server 135 is coupled to the control processing unit 131. The control processing unit 131 is coupled to a memory 134 that includes a stored database 134*a* including reference images for various hazardous conditions and for various locations, and PPEs required for the different locations, and PPEs required for the different hazardous conditions, and the locations for the various cameras.

As used herein, AI, also known as machine intelligence (MI), is intelligence demonstrated by machines, which is in contrast to the natural intelligence displayed by humans and some animals. AI refers to a device or system that perceives its environment and takes actions that maximize its chance of successfully achieving its goals that mimics cognitive functions that humans associate with other human minds, such as machine "learning" and machine "problem solving", where machine learning is an application of AI that provides automatic learning and improvement from experience without being explicitly programmed.

The AI unit 133 observes the image data captured in real-time by the cameras $110_1$, $110_2$, $110_3$, $110_4$ installed in the various work zones. Optionally also semi-supervised inputs are provided to the AI unit 133 by the work zone supervisor through the user interface 136 shown. The semi-supervised inputs can include correcting the recommendations of the AI unit 133 on any new suggestions provided by AI unit 133 based on past learning. These semi-supervised inputs can thus be used to enhance the future decisions by the AI unit 133.

The control processing unit 131 is for determining from the image data a current location of the individual that is based on the data feeds from the image processing unit 132 and the database 134*a*. The control processing unit 131 also determines a current minimum PPE requirement for the individual based on the current location by referencing to the database 134*a* that comprises a plurality of workplace environments each having at least one respective hazardous condition including for the current location, where the control processing unit 131 is for determining a current workplace environment having at least one hazardous condition, and required PPEs for the current hazardous condition. The image processing unit 132 and AI unit 133 are for analyzing the image data to identify PPEs currently being worn by the individual.

The control processing unit 131 is further for determining whether the individual is currently meeting the current minimum PPE requirement by comparing the PPEs currently being worn to the current minimum PPE requirement to identify an unsafe condition, and responsive to the unsafe condition, for generating a control signal for initiating at least one of an audible or visual alert that brings attention to the unsafe condition. For example, if the person entering a hazardous work zone is found not wearing the required PPEs, an alarm can be sent to an annunciation panel 150, as well as to the speakers 117 located in the work zone.

As known in the art of process control systems, an annunciator panel, or alarm annunciator, is a group of lights used as a central indicator of status of equipment or systems in an aircraft, industrial process, building or other installation. Usually, the annunciator panel includes a main warning lamp or audible signal to draw the attention of operating personnel in the control room to the annunciator panel for abnormal events or conditions. The audible alarm and instructions can also be passed on to the respective work zones through the plant public address (PA) system 152 shown in FIG. 1 that is interfaced through the application server 135.

In industrial process control, an annunciator panel is a system to alert operators of alarm conditions in the plant. Multiple back-lit windows are provided, each engraved with the name of a process alarm. Lamps in each window are controlled by hard-wired switches in the plant, arranged to operate when a process condition enters an abnormal state (such as high temperature, low pressure, loss of cooling water flow, or many others). Single point or multipoint alarm logic modules operate the window lights based on a preselected International Society of Automation (ISA) 18.1 annunciator sequence or a custom sequence.

Also shown in FIG. 1 is a conventional plant video manager 151 which can be used to manage and record videos of the work zones for later references and training or manual behavior analysis purpose. The PA system 152 interfaced through the application server 135 passes on the instructions on detecting an unsafe condition to the work zone in an even of alarm. There are also visual alert indicators $118_1$, $118_2$, $118_3$ in the respective work zones connected to the output interface 138.

Figure 2:
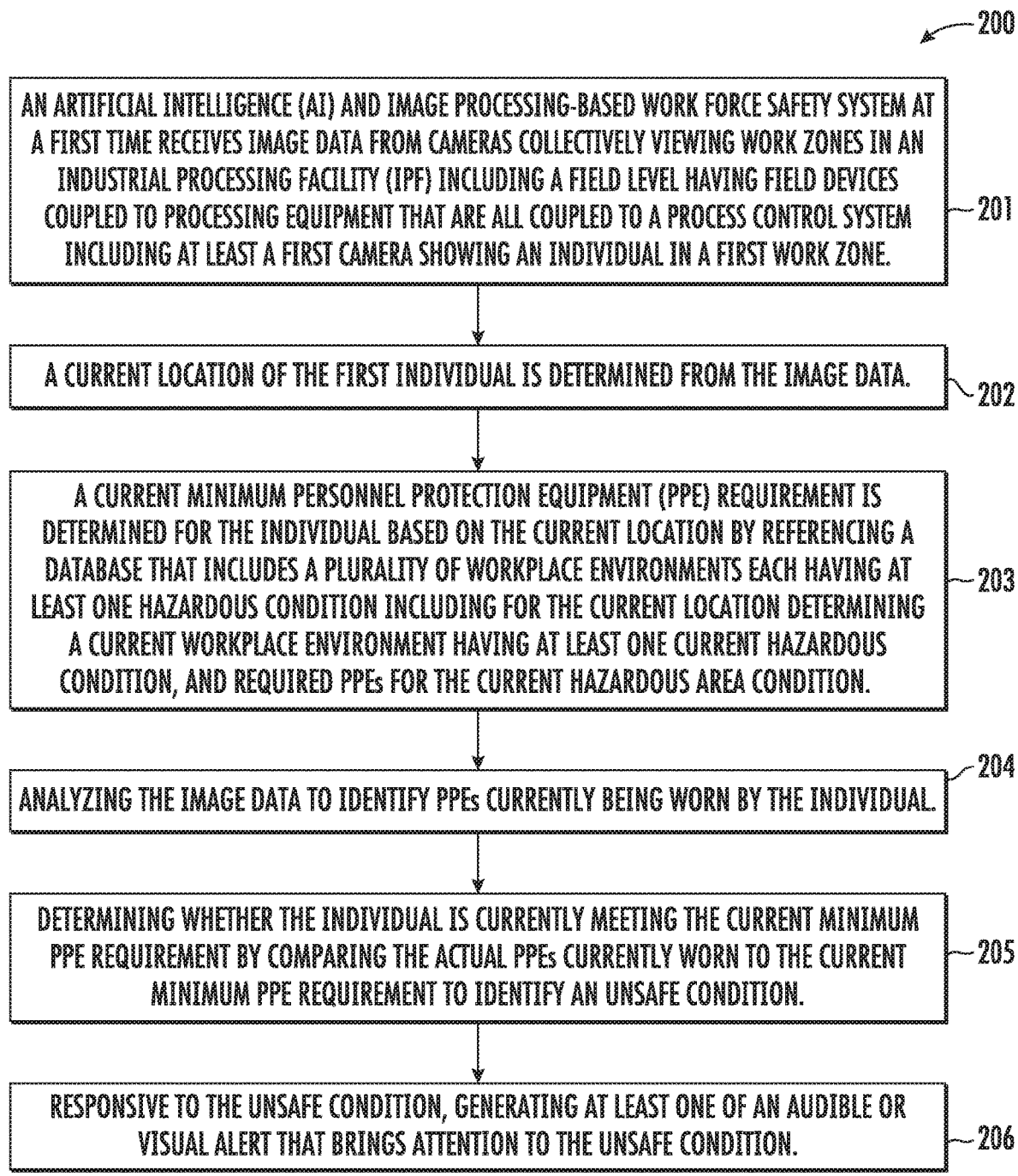
FIG. 2 is a flow chart that shows steps in an AI and image processing-based method of work place safety for an industrial processing facility, according to an example embodiment.

FIG. 2 is a flow chart that shows steps in an AI and image processing-based method 200 of workplace safety for IPF, according to an example embodiment. In step 201 an AI and image processing-based work force safety system 130 at a first time receives real-time image data from a plurality of cameras $110_1$, $110_2$, $110_3$, $110_4$ collectively viewing a plurality of work zones $102_1$, $102_2$, $102_3$ in an IPF 105. The IPF includes a field level 101 having field devices $103_1$, $103_2$, $103_3$, $103_4$, $103_5$, $103_6$ coupled to processing equipment $106_1$, $106_2$, $106_3$ that are all coupled to a process control system 120 including at least a first camera showing an individual in a first work zone. The field of view of the respective cameras generally overlap. The process control system 120 can comprise a distributed control system (DCS) or a supervisory control and data acquisition (SCADA) system.

Step 202 comprises determining from the image data a current location of the individual. Step 203 comprises determining a current minimum PPE requirement for the individual based on the current location by referencing to a database 134a comprising a plurality of workplace environments each having at least one respective hazardous condition including for the current location determining a current workplace environment having at least one hazardous condition, and the current required PPEs for the current hazardous condition. Example workplace environments can comprise an arc furnace taping bay, or a flue gas scrubbing area. Example hazardous conditions can comprise a high temperature, a high radiation level, or a loud noise level.

Step 204 comprise analyzing the image data to identify PPEs currently being worn by the individual. Step 205 comprises determining whether the individual is currently meeting the current minimum PPE requirement by comparing the PPEs currently being worn to the current minimum PPE requirement to identify an unsafe condition. Step 206 comprises responsive to the unsafe condition, generating at least one of an audible or visual alert in a work zone and/or control room that brings attention to the unsafe condition.

The method can further comprise at a second time receiving updated image data and identifying a new hazardous area condition from a change in the current workplace environment by comparing updated image data to reference image data stored in the database 134a. The AI and image processing-based work force safety system can also receive non-camera sensor data from sensors $104_1$, $104_2$ and $104_3$. The non-camera sensor data is shown in FIG. 1 communicated through the process control system 120, plant safety system 121 or the plant fire and gas detection system 122, that are all shown coupled to the control processing unit 131. This enables the AI and image processing-based work force safety system 130 to change the current minimum PPE requirement based on the non-camera sensor data.

When the audible or visual alert comprises a visual alert, the visual alert can be transmitted to an annunciation panel 150 in a control room of the IPF 105 as well as to a visual alert indicator $118_1$, $118_2$, $118_3$ in the work zones including in the first work zone. The AI and image processing-based work force safety system 130 from the current workplace environment can also determine a list of safe pre-conditions before performing a particular task at any of the work zones by reference to a standard work condition and a standard defined prerequisite stored in the database 134a. For example, communication of the need for a lockout procedure to be carried out can be implemented before maintaining processing equipment in a work zone.

The method can also comprise determining an emergency from the image data and providing evacuation assistance in the work zones by determining and communicating a safest path to a safe assembly area by determining a hazard level at each of the work zones, including interfacing with a PA system 152 at the field level 101 that assists in communicating a safe evacuation procedure. Thus, incidents in the IPF 105 can be real-time analyzed by the AI and image processing-based work force safety system 130 to provide inputs communicated over the PA system 152 regarding Safe Operating Procedures (SOPs) for the IPF for making an evacuation plan safer.

EXAMPLES

Disclosed embodiments of the invention are further illustrated by the following specific Examples, which should not be construed as limiting the scope or content of this Disclosure in any way.

As described above, disclosed AI and image processing-based work force safety systems can dynamically change the PPE requirements for a work zone based on the current conditions of the work zone by coordinating with other systems in the IPF 105. For example, if there is a hazardous gas leak detected by a gas sensor in a work zone of the plant that was previously not marked for usage of gas masks, the AI and image processing-based work force safety system 130 can take inputs from the process control system 120 about the gas leak received from gas sensors, and change the PPE requirement of the work zone dynamically. As another example, if there is a gas leak in an adjacent area to a work zone and if the wind direction sensed by a wind sensor is towards that work zone, disclosed solutions can change the PPE requirement of the work zone dynamically.

Disclosed AI and image processing-based work force safety systems can be used beyond for ensuring the use of correct PPEs, including for identification of unsafe plant conditions. For example, assume the work zone being monitored has a new barricade added or machinery in the work zone is now red-tagged (a do not operate condition). Known video monitoring system require new programming to take care of this new condition while a disclosed AI and image processing-based work force safety system 130 will understand the change in environment by observing the red tag on the machinery or the new barricade, and act accordingly with a change in the PPE requirement without the need for any reprogramming.

Disclosed solution can take care of the dynamic nature of the work zone environment. For example, if the safe work area changes in layout, a known video monitoring system will need to be re-programmed to take care of the change while a disclosed AI-based system can understand the change and thus modify the image analysis (not based on threshold images). For example, if a new scaffolding is put in the work zone, a known video monitoring system will need to be reprogrammed to look for usage of safety harness on the new scaffolding, while a disclosed solution will understand the safety requirement on a scaffolding and check for the safety harness on the people working on the scaffolding.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of workplace safety for an industrial processing facility (IPF) including a field level comprising a plurality of work zones having field devices coupled to processing equipment that are all coupled to a process control system, comprising:

an artificial intelligence (AI) and image processing-based work force safety system at a first time receiving real-time image data from a plurality of cameras collectively viewing said plurality of work zones including at least a first camera showing an individual in a first work zone of said plurality of work zones;

determining from said image data a current location of said individual;

determining a current minimum Personnel Protection Equipment (PPE) requirement for said individual based on said current location by referencing to a database comprising a plurality of workplace environments each having at least one respective hazardous condition including for said current location determining a current said workplace environment having at least one current said hazardous condition, and required PPEs for said current hazardous condition;

analyzing said image data to identify actual said PPEs currently worn by said individual;

determining whether said individual is currently meeting said current minimum PPE requirement by comparing said PPEs currently worn to said current minimum PPE requirement to identify an unsafe condition, and responsive to said unsafe condition, generating at least one of an audible alert and a visual alert that brings attention to said unsafe condition.

2. The method of claim 1, further comprising at a second time receiving updated said image data and identifying a new said hazardous area condition from a change in said current workplace environment by comparing said updated image data to reference image data.

3. The method of claim 1, further comprising said AI and image processing-based work force safety system receiving non-camera sensor data, and changing said current minimum PPE requirement based on said non-camera sensor data.

4. The method of claim 1, wherein said audible or visual alert comprises said visual alert, wherein said visual alert is transmitted to an annunciation panel in a control room of said IPF as well as to a visual alert indicator in said plurality of work zones including in said first work zone.

5. The method of claim 1, wherein said AI and image processing-based work force safety system from said current workplace environment determines a list of safe pre-conditions before performing a particular task at any of said plurality of work zones by reference to a stored standard work condition and a standard defined prerequisite.

6. The method of claim 1, wherein said audible alert or said visual alert comprises said audible alert.

7. The method of claim 1, further comprising determining an emergency from said image data and providing evacuation assistance in one of said plurality of work zones by determining and communicating a safest path to a safe assembly area by determining a hazard level at each of said plurality of work zones including interfacing with a public address (PA) system that assists in communicating a safe evacuation procedure.

8. An artificial intelligence (AI) and image processing-based work force safety system for an industrial processing facility (IPF) including a field level comprising a plurality of work zones having field devices coupled to processing equipment that are all coupled to a process control system, comprising:

an application server coupled to receive inputs from said process control system;

a control processing unit having a first input coupled to an output of said application server and a second input coupled to an output of a video scanner that is coupled to receive real-time image data from a plurality of cameras collectively viewing said plurality of work zones including at least a first camera showing an individual in a first work zone of said plurality of work zones;

an image processing unit and an artificial intelligence (AI) unit both coupled to said control processing unit;

said application server coupled to the control processing unit;

said control processing unit coupled to a memory that includes a stored database comprising a plurality of workplace environments each having at least one hazardous condition and required Personnel Protection Equipment (PPE) for said hazardous conditions;

wherein said control processing unit is for:
determining from said image data a current location of said individual;

determining a current minimum PPE requirement for said individual based on said current location by referencing said database to determine a current of said plurality of workplace environments having at least one current said hazardous condition, and a minimum PPE requirement from at least one said PPE for said current hazardous condition;

said image processing and computing block and said AI unit for analyzing said image data to identify actual said PPEs currently worn by said individual;

wherein said control processing unit is further for:
determining whether said individual is currently meeting said current minimum PPE requirement by comparing said PPEs currently being worn to said current minimum PPE requirement to identify an unsafe condition, and responsive to said unsafe condition, generating a control signal for initiating at least one of an audible alert and a visual alert that brings attention to said unsafe condition.

9. The AI and image processing-based work force safety system of claim 8, wherein said control processing unit is further for at a second time receiving updated said image data and identifying a new said hazardous area condition from a change in said current workplace environment by comparing said updated image data to reference image data.

10. The AI and image processing-based work force safety system of claim 8, wherein said IPF further includes non-camera sensors that provide non-camera sensor data, and wherein said AI and image processing-based work force safety system is further for receiving the non-camera sensor data and changing said current minimum PPE requirement level based on said non-camera sensor data.

11. The AI and image processing-based work force safety system of claim 8, wherein said audible later or said visual alert comprises said visual alert, and wherein said visual alert is transmitted to an annunciation panel in a control room of said IPF as well as to a visual alert indicator in said plurality of work zones including in said first work zone.

12. The AI and image processing-based work force safety system of claim 8, wherein said AI and image processing-based work force safety system from said current workplace environment determines a list of safe pre-conditions before performing a particular task at any of said plurality of work zones by reference to a standard work condition and a standard defined prerequisite stored in said database.

13. The AI and image processing-based work force safety system of claim 8, wherein said control processing unit is further for determining an emergency from said image data and providing evacuation assistance in said plurality of work zones by determining and communicating a safest path to a safe assembly area by determining a hazard level at each of said plurality of work zones including interfacing with a public address (PA) system that assists in communicating a safe evacuation procedure.

14. The AI and image processing-based work force safety system claim 8, wherein said IPF further includes a plant safety system and a plant fire and gas detection system that are both coupled to said control processing unit.

* * * * *